United States Patent
Procita et al.

(10) Patent No.: US 12,392,283 B1
(45) Date of Patent: Aug. 19, 2025

(54) ENERGY RECOVERY TURBOCHARGER WITH INTEGRAL MOTOR/GENERATOR

(71) Applicant: Flowserve Pte. Ltd., Singapore (SG)

(72) Inventors: Zachary Procita, Chalfont, PA (US); Scott C. Judge, Bethlehem, PA (US); Michael Huber Temesvari, Tribuswinkel (AT); Andreas Dreiss, Geestland (DE)

(73) Assignee: Flowserve Pte. Ltd., Singapore (SG)

( * ) Notice: Subject to any disclaimer, the term of this patent is extended or adjusted under 35 U.S.C. 154(b) by 0 days.

(21) Appl. No.: 18/665,171

(22) Filed: May 15, 2024

(51) Int. Cl.
*F02C 6/12* (2006.01)
*F01D 9/04* (2006.01)
(Continued)

(52) U.S. Cl.
CPC ............... *F02C 6/12* (2013.01); *F01D 9/041* (2013.01); *F01D 17/16* (2013.01); *F02B 37/10* (2013.01); *F02B 37/14* (2013.01); *F02B 37/24* (2013.01); *F02C 9/20* (2013.01); *F02B 2037/122* (2013.01); *F05D 2220/40* (2013.01); *F05D 2220/76* (2013.01)

(58) Field of Classification Search
CPC .... F02C 6/12; F02C 9/20; F02B 37/10; F02B 2037/122; F02B 37/14; F02B 37/22; F02B 37/225; F02B 37/24; F01D 9/041; F01D 17/16; F01D 17/162; F01D 17/165
See application file for complete search history.

(56) References Cited

U.S. PATENT DOCUMENTS

| 4,769,993 A |  | 9/1988 | Kawamura |
|---|---|---|---|
| 5,605,045 A | * | 2/1997 | Halimi .................... F02B 39/10 417/407 |

(Continued)

FOREIGN PATENT DOCUMENTS

| JP | 2007278066 A | 10/2007 |
|---|---|---|
| KR | 1020230002903 A | 1/2023 |

OTHER PUBLICATIONS

Turbochargers Archive "TurboChargers" [online], [retrieved on Aug. 12, 2024] <URL:https://energyrecovery.com/turbochargers/>.
(Continued)

*Primary Examiner* — Loren C Edwards
(74) *Attorney, Agent, or Firm* — Maine Cernota & Curran (57) ABSTRACT

An energy recovery turbocharger applicable to a pressurized process applies pressurized product fluid to a turbine runner that is mechanically cooperative with a pump impeller configured to pressurize a reactant fluid. An integral motor/generator, which can be coupled to the runner or impeller shaft, or directly to the runner or impeller, is configured to add or remove torque or load as needed. A controller can regulate the runner and impeller at desired rotation rates by controlling the energy delivered to or withdrawn from the motor/generator. In embodiments, the controller comprises a variable frequency drive. The runner and impeller can be linked by a mechanical transmission, which can be adjustable by the controller, or fixed to a common shaft and constrained to rotate at the same rate. In embodiments the turbine includes variable pitch input guide vanes that are adjusted by the controller according to the runner rotation rate.

14 Claims, 6 Drawing Sheets

(51) Int. Cl.

| | |
|---|---|
| *F01D 17/16* | (2006.01) |
| *F02B 37/10* | (2006.01) |
| *F02B 37/14* | (2006.01) |
| *F02B 37/24* | (2006.01) |
| *F02C 9/20* | (2006.01) |
| *F02B 37/12* | (2006.01) |

(56) References Cited

U.S. PATENT DOCUMENTS

| | | |
|---|---|---|
| 5,870,894 A | 2/1999 | Woollenweber |
| 2007/0108772 A1* | 5/2007 | Shibui ............... F02B 39/16 290/52 |
| 2013/0239568 A1 | 9/2013 | Krishnan |
| 2016/0017793 A1 | 1/2016 | Johnson |
| 2016/0319731 A1* | 11/2016 | Versteyhe ............ F02C 3/113 |
| 2023/0243294 A1* | 8/2023 | Lavertu ............... F02B 63/04 60/602 |

OTHER PUBLICATIONS

"Shin Nippon Machinery Co., LTD. ""Process Pumps—Supporting an evolving industrial basewith unique combinations"" [online], [retrieved on Aug. 12, 2024] <URL:http://www.snm.co.jp/products/process_pump.html>".

Sulzer "Hydraulic power recovery turbine" [online], [retrieved on Aug. 12, 2024] <URL:https://www.sulzer.com/en/shared/applications/hydraulic-power-recovery-turbine>.

International Search Report and Written Opinion for International Application No. PCT/US2025/020158 mail date Jun. 26, 2025, 13 pages.

* cited by examiner

ENERGY RECOVERY TURBOCHARGER WITH INTEGRAL MOTOR/GENERATOR

FIELD OF THE INVENTION

The invention relates to hybrid turbine/pump rotary apparatus, and more particularly, to energy recovery turbochargers applicable to pressurized processing of fluids.

BACKGROUND OF THE INVENTION

In many pressurized processes, a reactant fluid is transferred from a "source," such as a reactant container, pressurized, and introduced into a high-pressure reactor, where the reactant fluid is transformed, for example chemically reacted or decomposed, after which the resulting "product" fluid is returned to a lower pressure "product" container or other product destination. It will be noted that the terms "reactant" and "product" are used broadly herein to refer to any fluid that is transformed under pressure into a different state, and are not limited to only chemical reactions unless otherwise stated or required by context.

Often, a pressurized process is implemented using a continuous or "batch" reaction protocol, wherein reactant fluid enters an input of the high-pressure reactor while product fluid is concurrently removed from an output of the high-pressure reactor.

Typically, a pump, or a plurality of pumps, are used to pressurize the reactant fluid and transfer it to the high-pressure reactor. In some instances, the product fluid is simply allowed to flow, at a high pressure, to the product destination, where its kinetic energy is dissipated as turbulence and, ultimately, as heat.

However, in other instances, for example when the pressurized process is implemented on a large scale, it can be desirable to recapture from the product fluid some of the energy that was imparted to the reaction fluid during its pressurization. One approach is to direct the product fluid through a turbine that is mechanically cooperative with an energy recovery generator, so that electrical energy can be returned to the grid. However, a more efficient approach, which is applicable to some continuous or "batch" processes, is to implement a "fluid power recovery turbine," referred to herein as a "turbocharger," whereby as the product fluid flows out from the high-pressure reactor, it is directed to the turbine of a turbocharger, which mechanically drives the impeller of a turbocharger pump to concurrently pressurize reaction fluid as it enters the high-pressure reactor.

One problem with this approach is that many continuous and batch processes are subject to significant variations in flow rate and pressure, either during a given process, and/or when switching between different processes. Traditionally, turbochargers are optimized for only a narrow range of flow and head. As a result, the head and flow of the turbocharger pump and turbine cannot be separately changed without sacrificing efficiency. Furthermore, during some phases of operation the turbocharger pump may require more energy than can be derived from the turbocharger turbine, while during other phases of operation the turbocharger turbine may be subject to flows and pressures that exceed the requirements of the turbocharger pump, and may even pose a risk of damage to the turbocharger.

Accordingly, turbocharger systems typically implement one or more "helper" pumps that supplement the turbocharger pump to provide the required reactant pressure and flow when too little energy is produced by the turbocharger turbine.

When there is an excess of product fluid pressure and/or flow, traditional turbochargers often fail to fully utilize the surplus energy. Instead, they rely on a complex network of bypass and throttle valves to waste the excess energy, so that the turbocharger pump impeller and turbine runner operate at the speeds that they require, regardless of any excess in the pressure and aggregate flow of the product fluid. However, this approach wastes energy, and the dependence on mechanical valve systems can introduce feedback lags due to their slow mechanical response times, which can sometimes lead to mechanical failure of the turbocharger.

Also, due to the limited pressure and flow operating range of most turbochargers, when the parameters of a process are changed, or a new process is implemented that will generate significantly different flow rates and pressures, adjusting the operating range of the turbocharger to match the new process conditions can require disassembling the turbocharger and replacing some of its component elements.

What is needed, therefore, is an efficient energy recovery turbocharger applicable to a pressurized continuous or batch process that rapidly adapts to changes in process flow and pressure, reduces the requirements for mechanical bypass and throttle valves and helper pumps, and recaptures excess energy when pump requirements are exceeded.

SUMMARY OF THE INVENTION

The present invention is an efficient energy recovery turbocharger for a pressurized continuous or batch process that rapidly adapts to changes in process flow and pressure, reduces or eliminates any requirement for mechanical bypass and throttle valves and helper pumps, and recaptures excess energy when pump requirements are exceeded.

The disclosed turbocharger integrates the functionality of a turbocharger, a helper pump, and an energy recovery generator into a single, cohesive system. In addition to a turbocharger turbine that is mechanically cooperative with a turbocharger pump, the present invention further includes an integral motor/generator that is configured to receive power from the grid and provide additional torque to the pump when there is insufficient mechanical energy available from the turbine, and to capture excess mechanical energy when a surplus is available from the turbocharger turbine and convert it into electrical energy for delivery to the power grid. In some embodiments, the integral motor-generator is able to provide sufficient torque for initial startup of the process, while in other embodiments a separate startup pump is used for initial pressurization of the process, after which the integral motor/generator is able to supplement as needed the energy provided by the turbine.

In embodiments, an electronic controller quickly adjusts the electrical power delivered to, or withdrawn from, the motor/generator, thereby adapting to changes in pump energy demands and/or product fluid pressure and/or flow without the mechanical delays that would result from bypass and throttle valves. In embodiments, the electronic controller is a variable speed controller, such as a variable frequency drive, which is configured to automatically adjust the power delivered to or withdrawn from the motor/generator, thereby ensuring that the turbine runner and pump impeller of the turbocharger always rotate at their required rates.

The disclosed turbocharger operates by channeling the high-pressure product fluid stream from the reactor through guide vanes on the "turbine side" of the turbocharger, which accelerate the product fluid to a high velocity. The accelerated product fluid then imparts its momentum to a turbine runner, effectively transferring power to a shaft that supports the turbine runner. The product fluid then exits the runner, at a reduced pressure. In embodiments, as it flows away from the turbine runner, the product fluid flows through channels that surround the motor/generator to provide cooling to its electrical windings before exiting the turbocharger.

The turbocharger pump, which is mechanically cooperative with the turbocharger turbine and the motor/generator, draws reactant fluid from the reactant source and discharges it into the high-pressure reactor. In some embodiments, the turbine runner is linked to the pump impeller via a transmission, which can be a mechanical or "gearbox," or an electrical transmission that includes a motor and a generator. In embodiments, the transmission can be adjusted or "shifted" by the controller to vary a ratio between the rotation rates of the pump impeller and turbine runner. In other embodiments the pump impeller and turbine runner are directly coupled to a common shaft and rotate at the same rate.

In various embodiments, the pitch of the guide vanes is adjusted in real time by the controller, based on system and motor/generator feedback, thereby optimizing energy recovery from the product fluid. As a result, the efficiency of the energy recovery is maintained even when the dynamic requirements of the process and the available excess energy fluctuate.

A first general aspect of the present invention is an energy recovery turbocharger that is configured to pressurize a reactant fluid for delivery to a pressurized process, and to recover energy from a pressurized product fluid received from the pressurized process. The turbocharger includes a pump comprising an impeller fixed to an impeller shaft, a turbine comprising a runner fixed to a runner shaft, the runner shaft being mechanically coupled to the impeller shaft, so that rotation of the runner by the product fluid necessitates proportionate rotation of the impeller shaft, a motor/generator cooperative with at least one of the impeller, the impeller shaft, the runner, and the runner shaft, the motor/generator being configured to impart additional torque to the impeller when insufficient torque is applied to the impeller by the runner, and to withdraw excess torque from the rotor when excess torque is applied to the impeller by the runner, and a controller configured to control the motor/generator.

In embodiments, the controller is configured to control an amount of energy delivered to or received from the motor/generator. In some of these embodiments the controller comprises a variable speed drive configured to regulate rotation rates of the impeller and runner by said controlling the amount of energy delivered to or received from the motor/generator. And in some of these embodiments the variable speed drive is a variable frequency drive.

In any of the above embodiments, the runner shaft and the impeller shaft can be directly coupled to each other, or can be monolithic with each other, such that the impeller shaft is constrained to rotate at the same rate as the runner shaft. Or, the runner shaft can be mechanically coupled to the impeller shaft by a mechanical transmission that is configured to control a ratio between the impeller rotation rate and the runner rotation rate. In some of these embodiments, the mechanical transmission is adjustable by the controller, thereby enabling the controller to adjust the ratio between the impeller rotation rate and the runner rotation rate.

In any of the above embodiments, the motor/generator can be a direct drive motor/generator comprising a stator having electromagnet coils. In some of these embodiments, the motor/generator comprises a plurality of magnets fixed to the runner and configured to pass in proximity to the electromagnetic coils as the runner rotates. In other of these embodiments, the motor/generator comprises a plurality of magnets fixed to the impeller and configured to pass in proximity to the electromagnetic coils as the impeller rotates.

In any of the above embodiments, the turbine can further comprise a plurality of guide vanes configured to accelerate the product fluid as it enters the turbine and before it imparts its momentum to the runner. In some of these embodiments, a pitch of the guide vanes is variable. And in some of these embodiments the controller is configured to control and vary the pitch of the guide vanes.

In any of the above embodiments, the motor/generator can be configured to provide sufficient energy to the pump to enable the pump to pressurize the reactant fluid during an initial startup of the pressurized process, during which the product fluid is not yet flowing to the turbine.

A second general aspect of the present invention is a method of pressurizing a reactant fluid for delivery to a pressurized process, and recovering energy from a pressurized product fluid received from the pressurized process. The method includes providing a turbocharger according to the first general aspect, determining a desired rotation rate of the impeller, controlling a rotation rate of the impeller so that the impeller rotates at the desired rotation rate, and optimizing an efficiency of the turbine by adjusting the pitch of the guide vanes.

Controlling the rotation rate of the impeller includes measuring a rotation rate of the impeller, if the measured rotation rate of the impeller is greater than the desired rotation rate of the impeller, reducing an amount of electrical energy delivered to the motor generator or increasing an amount of energy withdrawn from the motor/generator until the measured rotation rate of the impeller is equal to the desired rotation rate of the impeller, and if the measured rotation rate of the impeller is less than the desired rotation rate of the impeller, increasing the amount of electrical energy delivered to the motor generator or decreasing the amount of energy withdrawn from the motor/generator until the measured rotation rate of the impeller is equal to the desired rotation rate of the impeller.

In embodiments, the controller comprises a variable frequency drive configured to regulate rotation rates of the impeller and runner by said controlling the amount of energy delivered to or received from the motor/generator.

In any of the above embodiments, the runner shaft and the impeller shaft can be directly coupled to each other, or monolithic with each other, such that the impeller shaft is constrained to rotate at the same rate as the runner shaft. Or, the runner shaft can be mechanically coupled to the impeller shaft by a mechanical transmission that is configured to control a ratio between the impeller rotation rate and the runner rotation rate, the mechanical transmission being adjustable by the controller, thereby enabling the controller to adjust the ratio between the impeller rotation rate and the runner rotation rate.

In any of the above embodiments, the motor/generator can be a direct drive motor/generator comprising a stator having electromagnet coils and a plurality of magnets fixed to the runner or to the impeller and configured to pass in proximity to the electromagnetic coils as the runner and the impeller rotate.

And in any of the above embodiments, a pitch of the guide vanes can be variable, and the controller can be configured to control and vary the pitch of the guide vanes.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is an efficient energy recovery turbocharger, applicable to a pressurized continuous or batch process, that rapidly adapts to changes in process flow and pressure, reduces or eliminates any requirements for mechanical bypass and throttle valves and/or helper pump systems, and recaptures excess energy when pump requirements are exceeded. The disclosed turbocharger integrates the functionality of a turbocharger, a helper pump, and an energy recovery generator into a single, cohesive system.

Figure 1A:
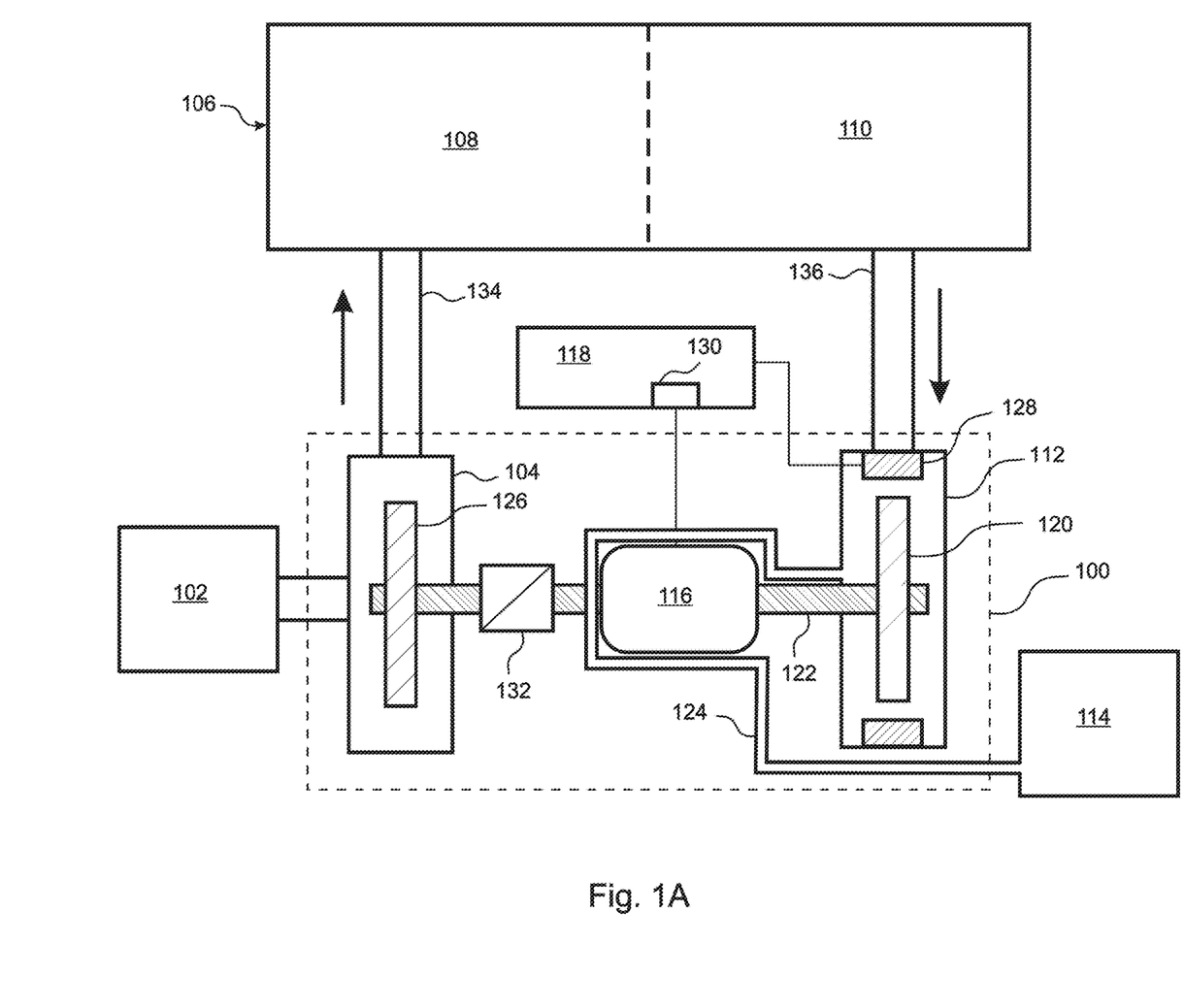
FIG. 1A is a conceptual block diagram of a first embodiment of the present invention.

With reference to the conceptual block diagram of FIG. 1A, the disclosed turbocharger is applicable to a pressurized processes wherein a reactant fluid is transferred from a "source," such as a reactant container 102, pressurized by a pump 104, and introduced from a pump outlet 134 into a high-pressure reactor 106, where the reactant fluid 108 is transformed, for example chemically reacted or decomposed, after which the resulting "product" fluid 110 flows out from the reactor 106 through a turbine inlet 136 into a turbine 112, and then is returned to a lower pressure "product" container 114 or other product destination. It will be noted that the terms "reactant" and "product" are used broadly herein to refer to any fluid that is transformed under pressure into a different state, and are not limited to only chemical reactions unless otherwise stated or required by context.

In embodiments, the disclosed turbocharger operates by channeling the high-pressure product fluid 110 from the reactor 106 through guide vanes 128 that are included in the turbine 112, which accelerate the product fluid 110 to a high velocity. In the illustrated embodiment the guide vanes 128 are variable in pitch, and are adjusted by a controller 118 in response to changes in operating conditions.

The accelerated product fluid 110 then imparts its momentum to the turbine runner 120, transferring power to a shaft 122 that supports the pump impeller 126, after which the product fluid exits the turbine 112 at a reduced pressure. In the illustrated embodiment, the turbine runner 120 is linked to the pump impeller 126 via a mechanical transmission or "gearbox" 132, which can also be adjusted or "shifted" by the controller 118 to vary the relative rotation rates of the pump impeller 126 and turbine runner 120. In similar embodiments, the turbine runner 120 is linked to the pump impeller 126 via an electrical transmission that includes a motor and a generator. In embodiments, the electrical transmission can be adjusted or "shifted" by the controller 118 to vary the ratio between the rotation rates of the pump impeller 126 and turbine runner 120. In other embodiments, as is discussed in more detail below with reference to FIGS. 2 and 3, the pump impeller 126 and turbine runner 120 are directly coupled to a common shaft 122, and rotate at the same rate. In the illustrated embodiment, the product fluid flows from the turbine impeller 126 through channels 124 that surround the motor/generator 116, thereby cooling its electrical windings before exiting the turbocharger 100.

Figure 1B:
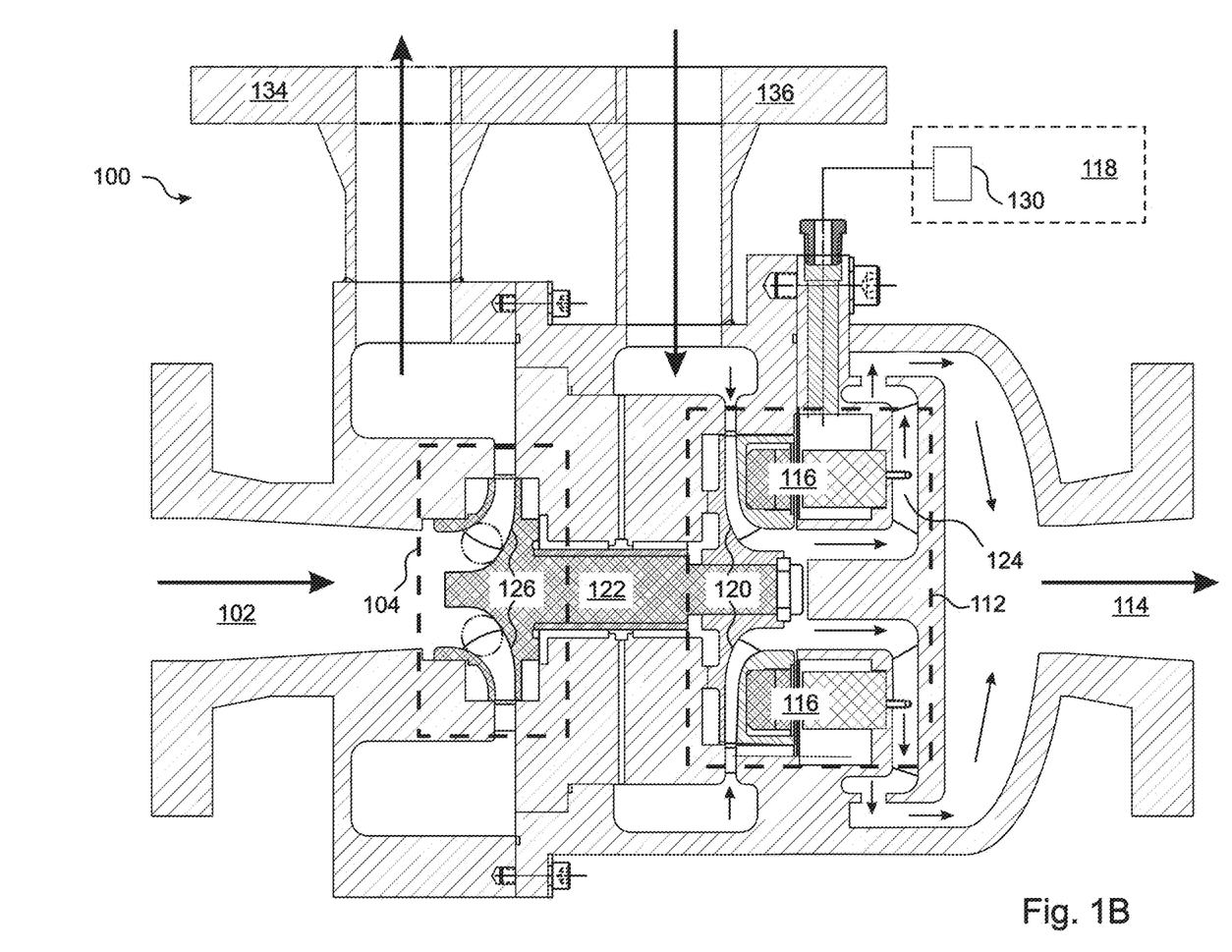
FIG. 1B is a cross-sectional illustration of a second embodiment of the present invention, drawn to scale except for the controller and variable frequency drive.
Figure 2:
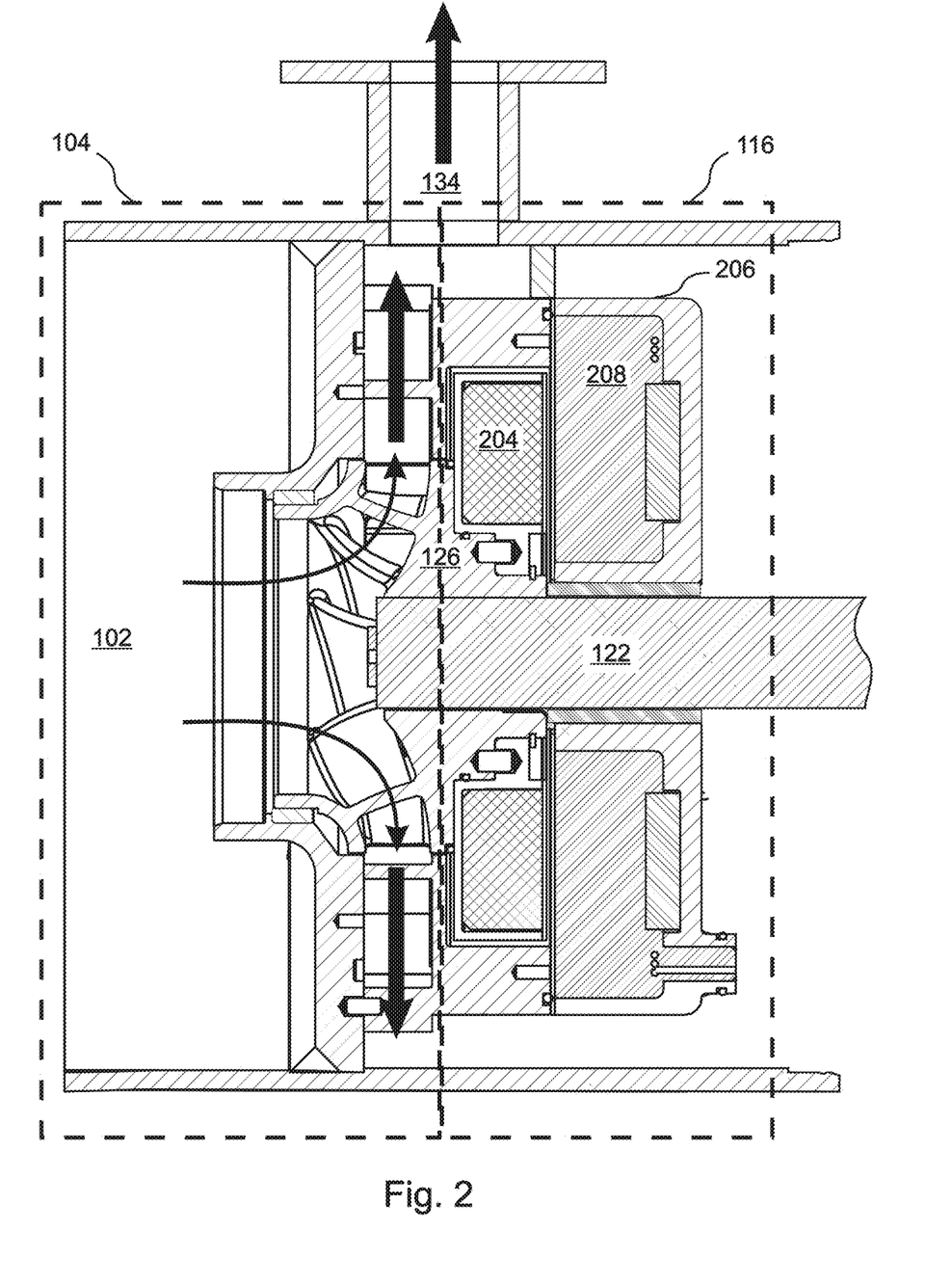
FIG. 2 is a sectional view drawn to scale of the motor of a third embodiment of the present invention.

In addition to a pump 104 and a turbine 112, the disclosed turbocharger 100 further comprises an integral motor/generator 116 that is configured to receive power from the grid and provide additional torque to the pump 104 when there is insufficient mechanical energy available from the turbine 112, and to capture excess mechanical energy when a surplus is available from the turbine 112 and convert it into electrical energy for delivery to the power grid. In the embodiment of FIG. 1A, the motor/generator 116 is cooperative with magnets (not shown) that are attached to a shaft 122 which interconnects the runner 120 of the turbine 112 with the impeller 126 of the pump 104. In the embodiments of FIGS. 1B and 2, discussed in more detail below, the motor/generator 116 is a "direct drive" motor/generator that is cooperative with magnets attached directly to either the impeller 126 of the pump 104 or the runner 120 of the turbine 112.

In embodiments, the electronic controller 118 regulates the rotation rates of the turbine runner 126 and the pump impeller 126 by quickly adjusting the electrical power that is delivered to or withdrawn from the motor/generator 116, thereby adapting to changes in pump energy demands and/or product fluid pressure and/or flow without the mechanical delays that would result from bypass and throttle valves. In various embodiments, the electronic controller 118 a variable speed drive, such as a variable frequency drive 130, which is configured to ensure that the turbocharger turbine always rotates at the rate that is required by the pump.

FIG. 1B is a cross-sectional view, drawn to scale (except for the controller 118, 130), of an embodiment that is similar in concept to FIG. 1A, except that the integral motor/generator 116 is a direct drive motor generator 116 which comprises magnets that are directly attached to the turbine runner.

FIG. 2 is a sectional view of a pump 104 and integral direct drive motor/generator 116 in which the motor generator comprises magnets that are directly attached to the impeller 126 of the pump. In the embodiment of FIG. 2, a plurality of permanent magnets 204 are directly attached to a rear side of the pump impeller 126, and are caused to pass close to electromagnetic coils 208 of an adjacent stator 206 as the impeller 126 is rotated. Torque is thereby transmitted directly from the electromagnet motor coils 208 to the impeller 126 when the motor/generator 116 is operating as a motor, or electromagnetic energy is transferred from the impeller 126 to the generator coils 208 when the motor/generator 116 is operating as a generator.

Figure 3A:
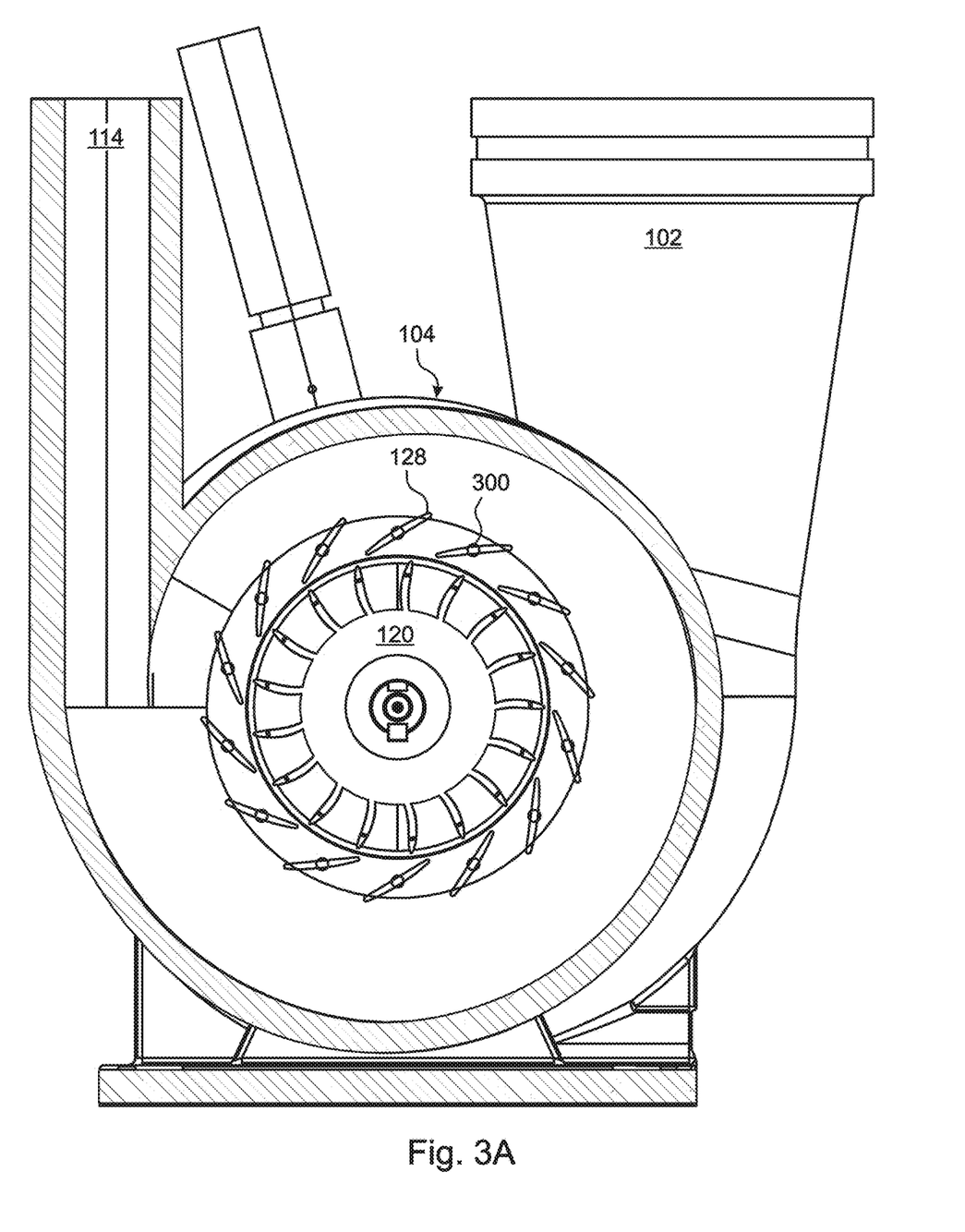
FIG. 3A is a sectional side view, drawn to scale, of a turbine of a fourth embodiment of the present invention, showing the guide vanes mounted on vane posts.
Figure 3B:
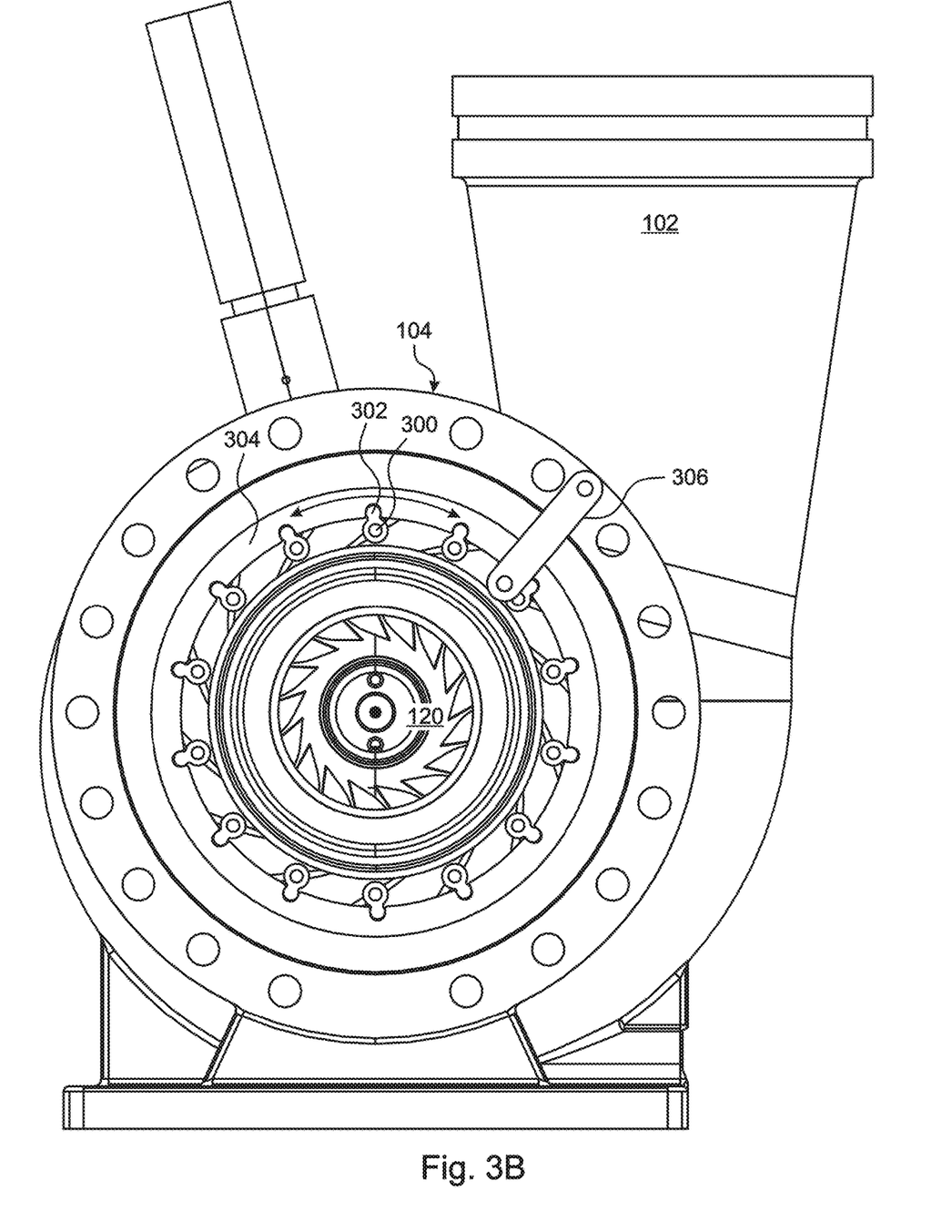
FIG. 3B is a side view, drawn to scale, of the turbine of FIG. 3A shown with the runner cover removed.
Figure 3C:
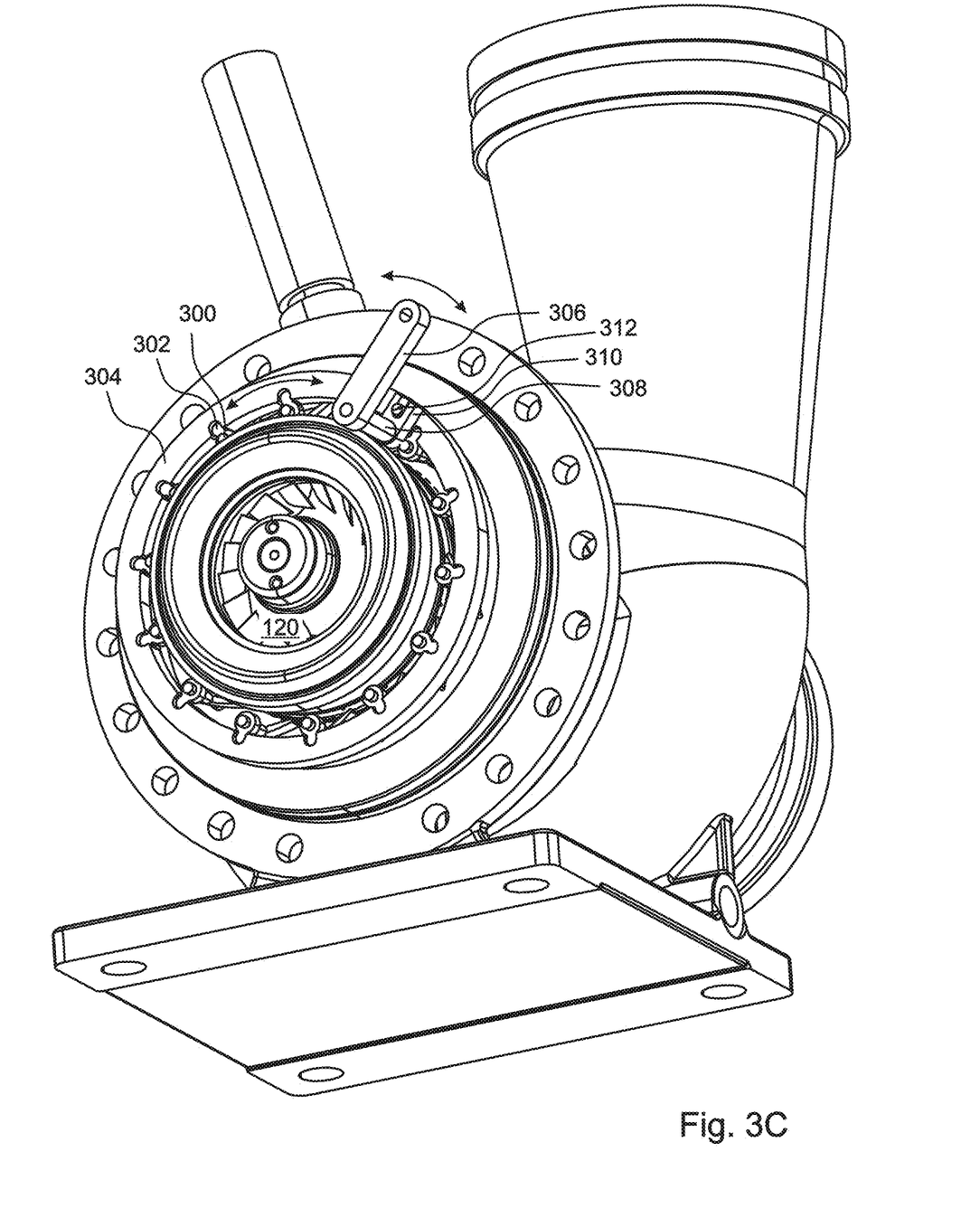
FIG. 3C is a perspective side view of the embodiment of FIG. 3B, drawn to scale.

With reference to FIGS. 3A-3C, in various embodiments the pitch of the guide vanes 128 is adjusted by the controller 118 in real time, based on feedback from the reactor 106 and motor/generator 116, thereby optimizing energy recovery from the product fluid 110. As a result, the efficiency of the energy recovery is maintained even when the dynamic requirements of the process and the available excess energy fluctuate. With reference to the sectional view of FIG. 3A, in the illustrated embodiment the guide vanes 128 are supported by, and pivot with, vane posts 300. FIG. 3B is a side view in which the turbine inlet 114 has been removed to reveal the mechanism that rotates the vane posts 300, and thereby rotates the guide vanes 128. It can be seen in the figure that, in this embodiment, each of the vane posts 300 terminates in a cam 302, which is engaged with a corresponding slot in a rotatable adjustment annulus 304. Rotation of the adjustment annulus 304 simultaneously rotates all of the vane cams 302, and thereby rotates all of the guide vanes 128 together. With reference to FIGS. 3B and 3C, in the illustrated embodiment the adjustment annulus 304 is rotated by an adjustment lever 306, which rotates an adjustment shaft 308 that terminates in an adjustment cam 310, which is engaged with an adjustment pin 312 provided on the adjustment annulus 304. Rotation of the adjustment lever 306 by the controller 118 can be implemented by any means known in the art, such as by a stepper motor.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. An energy recovery turbocharger configured to pressurize a reactant fluid for delivery to a pressurized process, and to recover energy from a pressurized product fluid received from the pressurized process, the turbocharger comprising:
    a pump comprising an impeller fixed to an impeller shaft, the pump being configured to deliver the reactant fluid to the pressurized process at a required reactant pressure by rotating the impeller at a required impeller rate;
    a turbine comprising a runner fixed to a runner shaft, the runner shaft being mechanically coupled to the impeller shaft, so that rotation of the runner at a runner rotation rate necessitates rotation of the impeller shaft at a proportionate impeller rotation rate, and so that rotation of the impeller shaft at the proportionate impeller rotation rate necessitates rotation of the runner at the runner rotation rate, the turbine being configured to apply a torque to the impeller according to an impact upon the runner by the pressurized product fluid;
    a variable speed motor/generator mechanically cooperative with at least one of the impeller, the impeller shaft, the runner, and the runner shaft, the motor/generator being configured to impart additional torque to the impeller by receiving supplemental electrical energy from a power grid, and to withdraw excess torque from the impeller by generating excess electrical energy and delivering the excess electrical energy to the power grid;
    a plurality of guide vanes configured to accelerate the pressurized product fluid as the pressurized product fluid enters the turbine, and before the pressurized product fluid impacts the runner, a pitch of the guide vanes being variable; and
    a controller configured to control the impeller rotation rate such that the impeller rotation rate is equal to the required impeller rotation rate, thereby ensuring that the reactant fluid is supplied to the pressurized process at the required reactant pressure, without causing a bypass valve or a throttle valve to modify a flow of the pressurized product fluid to the turbocharger, said controlling of the impeller rotation rate comprising controlling by the controller of the supplemental electrical energy received by the motor/generator from the power grid and controlling by the controller of the excess electrical energy generated by the motor/generator and delivered to the power grid;
    the controller being further configured to adjust the pitch of the guide vanes such that an energy efficiency of the turbine is optimized when the runner rotates at the runner rotation rate that is necessitated by rotation of the impeller at the required impeller rotation rate.

2. The turbocharger of claim 1, wherein the controller comprises a variable frequency drive.

3. The turbocharger of claim 1, wherein the runner shaft is mechanically coupled to the impeller shaft by a mechanical transmission that is configured to control a ratio between the impeller rotation rate and the runner rotation rate.

4. The turbocharger of claim 3, wherein the mechanical transmission is adjustable by the controller, thereby enabling the controller to adjust the ratio between the impeller rotation rate and the runner rotation rate.

5. The turbocharger of claim 1, wherein the runner shaft and the impeller shaft are directly coupled to each other, or are monolithic with each other, such that the impeller rotation rate is constrained to be equal to the runner rotation rate.

6. The turbocharger of claim 1, wherein the motor/generator is a direct drive motor/generator comprising a stator having electromagnet coils.

7. The turbocharger of claim 6, wherein the motor/generator comprises a plurality of magnets fixed to the runner and configured to pass in proximity to the electromagnetic coils as the runner rotates.

8. The turbocharger of claim 6, wherein the motor/generator comprises a plurality of magnets fixed to the impeller and configured to pass in proximity to the electromagnetic coils as the impeller rotates.

9. The turbocharger of claim 1, wherein the motor/generator is configured to impart sufficient additional torque to the impeller to cause the impeller to rotate at the required impeller rotation rate during an initial startup of the pressurized process, during which the pressurized product fluid is not yet flowing to the turbine.

10. A method of pressurizing a reactant fluid for delivery to a pressurized process, and recovering energy from a pressurized product fluid received from the pressurized process, the method comprising:
provinding the turbocharger according to claim 1;
determining the required impeller rotation rate that will cause the pump to deliver the reactant fluid to the pressurized process at the required reactant pressure;
causing the impeller to rotate at the required impeller rotation rate without causing the bypass valve or the throttle valve to modify the flow of the pressurized product fluid to the turbocharger; and
adjusting the pitch of the guide vanes so as to optimize the energy efficiency of the turbine when the runner rotates at the runner rotation rate that is necessitated by rotation of the impeller at the required impeller rotation rate;
wherein causing the impeller to rotate at the required impeller rotation rate comprises:
measuring the impeller rotation rate;
if the measured impeller rotation rate is greater than the required impeller rotation rate, reducing an amount of the supplemental electrical energy received by the motor/generator from the power grid or increasing an amount of the excess electrical energy delivered by the motor/generator to the power grid until the measured impeller rotation rate is equal to the required impeller rotation; and
if the measured impeller rotation rate is less than the required impeller rotation rate, increasing the amount of the supplemental electrical energy received by the motor/generator from the power grid or decreasing the amount of the excess electrical energy delivered by the motor/generator to the power grid until the measured impeller rotation rate is equal to the desired required impeller rotation rate.

11. The method of claim 10, wherein the controller comprises a variable frequency drive configured to control the amount of the supplemental electrical energy received by the motor/generator from the power grid and the amount of the excess electrical energy delivered by the motor/generator to the power grid.

12. The method of claim 10, wherein:
the runner shaft is mechanically coupled to the impeller shaft by a mechanical transmission that is configured to control a ratio between the impeller rotation rate and the runner rotation rate; and
causing the impeller to rotate at the required impeller rotation rate comprises adjusting of the mechanical transmission by the controller, thereby adjusting the ratio between the impeller rotation rate and the runner rotation rate.

13. The method of claim 10, wherein the runner shaft and the impeller shaft are directly coupled to each other, or are monolithic with each other, such that the impeller rotation rate is constrained to be equal to the runner rotation rate.

14. The method of claim 10, wherein the motor/generator is a direct drive motor/generator comprising a stator having electromagnet coils and a plurality of magnets fixed to the runner or to the impeller and configured to pass in proximity to the electromagnetic coils as the runner and the impeller rotate.

* * * * *